Dec. 15, 1936.  H. B. FOSTER  2,064,468
PRODUCTION OF PHTHALIC ANHYDRIDE IN FINELY DIVIDED SOLID FORM
Filed April 27, 1933
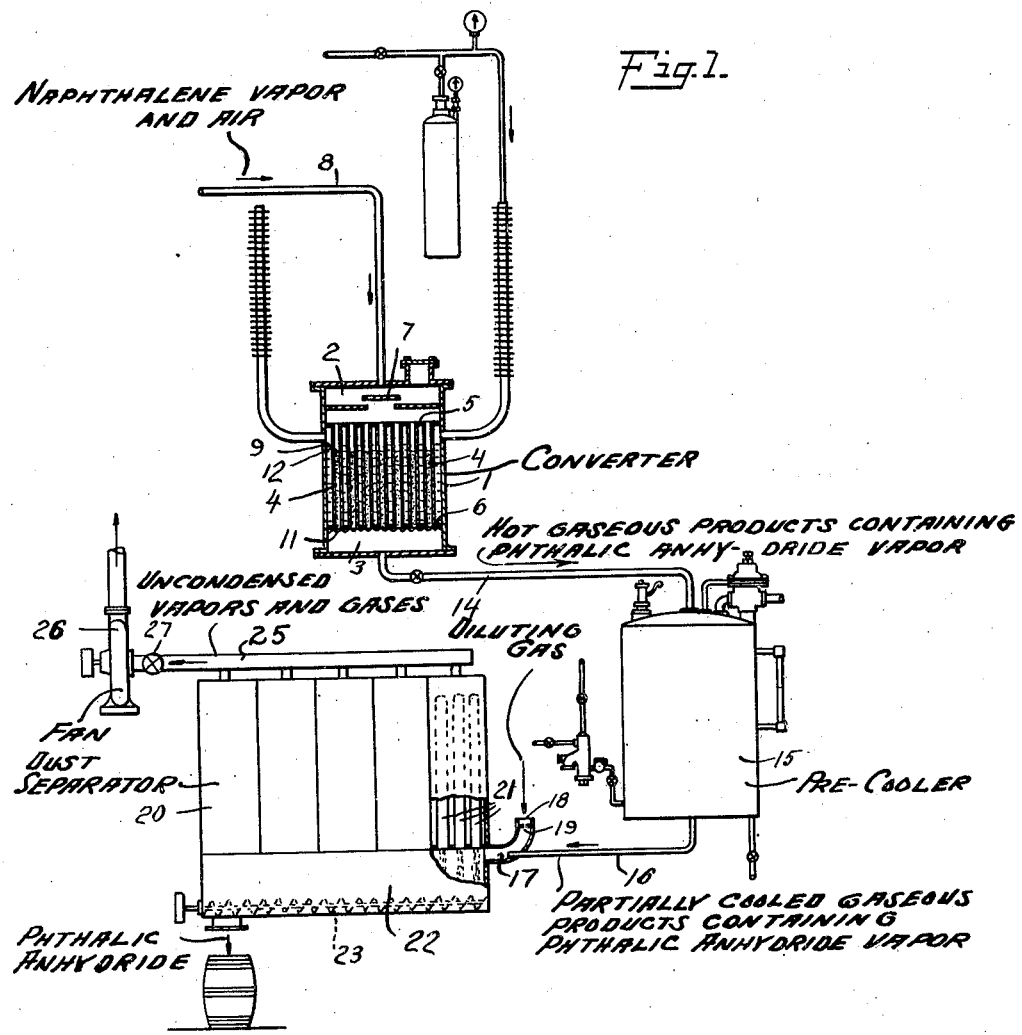
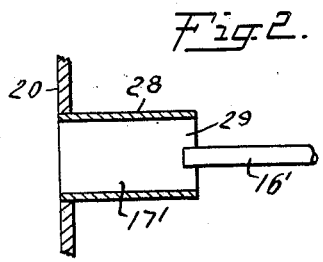
INVENTOR
Harold B. Foster
BY
ATTORNEY Patented Dec. 15, 1936

2,064,468

UNITED STATES PATENT OFFICE 2,064,468

PRODUCTION OF PHTHALIC ANHYDRIDE IN FINELY DIVIDED SOLID FORM

Harold B. Foster, Williamsville, N. Y., assignor to National Aniline & Chemical Company, Inc., New York, N. Y., a corporation of New York Application April 27, 1933, Serial No. 668,159

11 Claims. (Cl. 260—123)

This invention relates to organic products of the partial oxidation of organic compounds and to their recovery and/or production in solid form from vapors thereof. It relates particularly to the recovery of phthalic anhydride from gaseous or vaporous mixtures, and especially to a method and apparatus for recovering it from gaseous mixtures resulting from the vapor phase catalytic partial oxidation of organic compounds. The invention also includes the purification of said phthalic anhydride.

In the manufacture of organic products such as phthalic anhydride by the partial oxidation of organic compounds, in accordance with one well known method heretofore generally practiced, vapors of an organic compound, as for example naphthalene, methyl naphthalene, their derivatives, etc., are mixed with air or other oxidizing gas, the mixture is brought into contact with an oxidation catalyst under controlled reaction conditions, and the resulting reaction mixture is indirectly cooled to condense the desired partial oxidation product (phthalic anhydride) thereby formed. The reaction mixtures resulting from the catalytic oxidation generally contain, in addition to the desired product, a number of other substances in various amounts, which sometimes condense with the desired product, thereby contaminating it; so that a subsequent purification of the desired product is generally required before it can be employed for the usual purposes.

As generally carried out in practice, the reacted mixture of vapors leaving the catalyst chamber, or converter, contains a relatively small amount of the desired oxidation product in admixture with a relatively large amount of residual gases and is at an elevated temperature which lies considerably above the dew-point of the desired product. In order to recover the desired product, the reacted mixture is passed through a cooler adapted to maintain the reacted mixture at a temperature just above the dew-point of the desired product, and the cooled mixture is then passed through a large air-cooled condenser which gradually reduces the temperature of the mixture to the dew-point of the desired product, thereby causing it to condense.

It is a difficult problem to control the temperature of the condenser in such a manner as to secure efficient operation. The necessarily large size of the condenser, the inevitable fluctuation in the rate at which the mixture of vapors and gases enters the condenser, and the seasonal and even daily variation in atmospheric temperature all contribute to make it difficult to maintain the condenser at constant temperature. For example, in the production of phthalic anhydride by subjecting naphthalene in the vapor phase to partial or selective oxidation by means of oxygen or an oxygen-containing gas in the precence of a suitable catalyzer at an appropriate temperature, it is well known that the phthalic anhydride produced is usually contaminated with certain impurities such as, for example, maleic anhydride, maleic acid and other unsaturated acids, benzoic acid, quinones and like bodies, phthaleins, tar, naphthalene, etc., and some water. When the phthalic anhydride is recovered from the reacted vapor mixture passing from the catalyst chamber by indirectly cooling and condensing it in large chambers, as above described, the recovered phthalic anhydride is in the form of long needle-like crystals which are bulky and cumbersome to handle. Furthermore, the phthalic anhydride crystals, as thus obtained, are not uniform in size, composition or color. The crystals vary in size from large to very small, which is objectionable for many uses to which the product is put; since, for uniform results in the chemical processes for which the compounds serve as intermediates, it is desirable that the crystals be of uniform size. The phthalic anhydride is contaminated non-uniformly with various impurities so that before use it is ordinarily subjected to a purification process such as, for example, fractional distillation or crystallization from suitable solvents. It has been proposed to purify the crude phthalic anhydride by subliming the crude product and fractionally condensing the sublimed vapors. This procedure has the disadvantage, however, that it effects only a partial purification; since but a relatively small portion of the phthalic anhydride is obtained in the desired purified condition. The major portion of the material must be repeatedly sublimed, owing to the presence of sublimable impurities which are separated from the phthalic anhydride only with difficulty.

In addition, the phthalic anhydride crystals adhere to the walls of the condensing chamber, so that periodically it is necessary for workmen to enter the chambers and scale the crystals from the walls. As the vapors of quinones, maleic anhydride and other impurities present in the chambers with the phthalic anhydride crystals are irritating to the skin and membranes of the nose and throat, the process leads to unhealthful and disagreeable working conditions.

An object of the present invention is to provide a process whereby phthalic anhydride may be recovered in a simple and efficient manner from gaseous reaction mixtures resulting from the catalytic oxidation of vapors of naphthalene and other organic compounds, while avoiding unhealthful and disagreeable working conditions.

Another object of the present invention is to provide a process whereby a purification may be effected simultaneously with the recovery of phthalic anhydride from gas or vapor mixtures containing the same.

A further object of the invention is to provide a process whereby phthalic anhydride may be directly produced in the form of finely divided particles or crystals from vapors of said product and especially from gaseous reaction mixtures obtained in the manufacture thereof.

Additional objects of the invention are to provide a process whereby phthalic anhydride may be directly recovered in the form of finely divided crystals and in a purified condition from the gaseous reaction mixtures resulting from the catalytic air oxidation of naphthalene vapors, and to provide a process whereby phthalic anhydride may be directly recovered from such gaseous reaction mixtures in the form of a product of relatively uniform composition.

Other objects of the invention in part will be obvious and in part will appear hereinafter.

I have found, in accordance with the present invention, that the above objections to the prior methods of recovering and purifying phthalic anhydride can be overcome, to a large extent at least, by providing a process and apparatus in which a diluting gas is mixed with the gas mixture containing the phthalic anhydride to be recovered or purified while rapidly cooling the mixture to or below the dew-point of the resulting mixture with respect to phthalic anhydride. In the preferred practice of the invention, the dilution and cooling are both effected by the diluting gas. The phthalic anhydride is thereby condensed or precipitated in the form of a powder or dust of finely divided particles or crystals, which may then be separated from the gas in any suitable manner.

The invention accordingly comprises the steps and their relation, the apparatus adapted to carry out said steps, and the products which will be illustrated in the processes, apparatus and products hereinafter disclosed. The scope of the invention will be indicated in the appended patent claims.

In the practice of the invention in accordance with a preferred mode of procedure, phthalic anhydride in the vapor form is mixed with a diluting gas which is at a temperature adapted to bring the temperature of the resulting mixture to or below the dew-point of said resulting mixture with respect to phthalic anhydride, whereby the phthalic anhydride is precipitated as a dust or suspension of fine, solid particles or small crystals in the remaining gas mixture. The precipitated phthalic anhydride then may be separated from the remaining gas mixture. (The dew-point of a gaseous mixture with respect to any vapors contained therein, as the term is employed herein, is that temperature at which the vapor begins to precipitate in the liquid or solid phase from the mixture. It depends upon various factors, such as the nature of the vaporous material, the nature of the gaseous compounds of the mixture, and the pressure, as well as the ratio of vaporous materials to the gas mixture.)

The phthalic anhydride to be recovered and/or purified and/or converted to the dust-like form may be in the form of phthalic anhydride vapors alone or in the form of any suitable vapor or gaseous mixture containing said vapors with or without vapors of impurities and/or other products. It may, for example, be a gaseous reaction mixture resulting from the partial oxidation of vapors of an organic compound, such as naphthalene, with air or other oxidizing gas in the presence of a catalyst; or it may be a vapor mixture resulting from the distillation or sublimation of an impure or partially purified phthalic anhydride alone or in admixture with air, flue gas or other gaseous or vaporous conveying medium, or the like. The phthalic anhydride vapor, or vaporous or gaseous mixture, may be at any suitable temperature; for ease of control and efficiency in operation, the vapor or mixture may be advantageously at a controlled temperature just before the dilution, and preferably at a temperature only a little (3°–15° C.) above the dew-point of the mixture with respect to phthalic anhydride. When air is used as the cooling and diluting gas, the composition and temperature of the vapor or mixture, before dilution, may be advantageously adjusted so that the major portion of the phthalic anhydride is precipitated from the cooled and diluted mixture without requiring precooling of the diluting air; so that air at ordinary atmospheric temperature may be employed.

The diluting gas may be air or any other suitable gas which is inert to phthalic anhydride; as for example, carbon dioxide, nitrogen, flue gases, etc. Residual gases from the process also may be used as the diluting gas, thereby reducing to some extent the amount of unprecipitated product carried off by the residual gases. While the amount of moisture ordinarily present in air or the other said diluting gases is generally not objectionable, in some cases the air or other gas may be dried before use; as for example, when climatic conditions require it.

Since, in the preferred practice of the present invention the steps of rapidly cooling and of diluting the gas mixture are simultaneously brought about by the action of the diluting gas itself, the diluting gas, before its admixture with the vapor or gas mixture from which the phthalic anhydride is to be recovered, is preferably at least at a temperature such that the temperature of the resulting gas mixture, after dilution, will be sufficiently below the dew-point of said resulting mixture with respect to phthalic anhydride to accomplish the desired precipitation of the phthalic anhydride. If not at a sufficiently low temperature, the diluting gas may be pre-cooled. In order to avoid undue loss of the product in the residual gases, the diluting gas is ordinarily employed at a minimum temperature consistent with efficient operation.

The amount of diluting gas employed for the dilution will depend upon several factors; as for example, the temperature of the gas mixture before dilution, the desired final temperature of the diluted gas mixture, and, if purification is also desired to be accomplished, the nature and amount of other vapors present. In general, where yield of product is the prime consideration, the minimum amount of diluting gas which will effect a maximum cooling is used to effect maximum precipitation of the phthalic anhydride.

accordingly the gas mixture is diluted with the least amount of diluting gas which will effect a lowering of the temperature to a sufficient extent to precipitate a maximum amount of the phthalic anhydride. On the other hand, where quality and not yield is the prime consideration and where dilution only to an extent corresponding with a maximum yield of product at a minimum temperature causes precipitation of impurities, dilution may be carried to a greater extent, or a higher temperature may be used. While too great an amount of diluting gas is ordinarily to be avoided when a high yield of product is desired, owing to the loss of product in the residual gases, in some cases it may be more economical to employ the larger amounts of diluting gas and use the residual gases as the diluting gas, after cooling them if necessary, and while bleeding off a part of the residual gases so as to remove excess gas and prevent undue accumulation of impurities, if present.

The diluting gas may be mixed with the gaseous mixture in any suitable manner and by means of any suitable apparatus. It is preferably rapidly mixed with the diluting gas by injector or similar action.

The precipitated phthalic anhydride may be separated from the cooled and diluted gaseous mixture in any suitable manner and by means of any suitable apparatus. Preferably it is recovered or separated from the residual gases by filtration through suitable screens or bag filters; as for example those of the type usually employed for the removal of dust from air.

The invention will be further illustrated as embodied in a process for the recovery of phthalic anhydride from a gaseous reaction mixture resulting from the vapor phase catalytic air oxidation of naphthalene, and in conjunction with the accompanying drawing, which illustrates a preferred form of apparatus embodying the invention.

In the drawing Fig. 1 is an elevation, partly in section, showing the arrangement of the apparatus. Fig. 2 is a sectional detail showing a modified form of a portion of the apparatus.

Referring to Fig. 1 of the drawing, a converter 1 consists of a steel shell having an inlet compartment 2 at the top and an outlet compartment 3 at the bottom, and provided between these two compartments with a plurality of closely spaced, thin-walled tubes 4 held between an upper tube-sheet 5 and a lower tube-sheet 6. Baffle plates 7 are provided in the inlet compartment 2 in order to insure uniform distribution to the tubes 4 of the gaseous mixture entering said compartment through inlet tube 8. The space between the tube-sheets 5 and 6 within the converter shell surrounding the tubes 4 is filled to a level indicated at 9 with a liquid (for example mercury) which boils at about the temperature of the reaction.

The tubes 4 are filled with a suitable catalyst, for example vanadium oxide associated with a suitable granular carrier, conveniently supported by a screen 11 adjacent the bottom ends of tubes 4 which are filled up to a level, indicated at 12, just below the level 9 of the temperature controlling liquid. A valved outlet pipe 14 leads from the outlet compartment of the converter to a cooler 15 which is connected by an outlet pipe 16 to a mixing chamber 17 provided with an inlet 18 for diluting gas. The outlet of the mixing chamber is connected with a dust separator 20 containing suitable filters, shown as bags 21, for removing the recovered product from the remaining gas mixture and dropping it into a hopper 22 from which it is removed by a conveyor 23. An outlet 25 for residual gases from the dust separator 20 leads to a suction fan 26 for exhausting gases from the apparatus. Suitable heating jackets and/or lagging (not shown) are provided to maintain necessary temperatures in the various pieces of apparatus, piping, etc., and/or to reduce loss of heat, as is customary in the art.

In the operation of the process of recovering phthalic anhydride in connection with the apparatus above described, a mixture of naphthalene vapor and air in the proportion of about 1 part by weight of naphthalene to 25 to 35 parts by weight of air is introduced into the catalytic converter 1 where it is brought into contact with the catalyst in the tubes 4. The converter is heated to a reactive temperature, for example, 450° to 600° C. at the commencement of operation, after which the heat of reaction is more than sufficient to maintain it in operation. Excess heat of reaction is removed from the catalyst as heat of vaporization of the liquid surrounding the tubes 4, the boiling point of which is controlled, if necessary, by regulating the pressure on said liquid by an inert gas under pressure. The naphthalene is partially oxidized to phthalic anhydride in contact with the catalyst in tubes 4 and the resulting reacted gaseous or vapor mixture (containing phthalic anhydride, other partial oxidation products, products of combustion, and residual air) passes from the converter through the pipe 14.

For efficient operation, it is desirable that the reacted vaporous mixture enter the mixing chamber 17 at a temperature slightly above, or corresponding substantially with, the dew-point of the desired product (phthalic anhydride). Owing to the variation in operating conditions of the converter, there is a corresponding variation in the temperature of the reacted vapor mixture leaving the converter. In order to mix optimum quantities of diluting gas under optimum temperature conditions with such a varying gaseous mixture, careful observation and regulation of the diluting gas would ordinarily be required. However, by providing a cooler for the reacted vapor mixture which is adapted to maintain said vapor mixture at any desired temperature above the dew-point thereof, for example at a temperature just above the dew-point thereof, with respect to the phthalic anhydride, the temperature and quantity of diluting gas may be fixed for a standard concentration of phthalic anhydride in the reacted vapor mixture and operation may be carried on substantially without observation. Such a cooler is shown as cooler 15 into which the gases from pipe 14 are passed. The cooler 15 comprises a suitable indirect cooling means, as for example a two-phase liquid-vapor system having the liquid phase (for example, water) in indirect heat transfer relationship with the reacted vapor mixture and the boiling point of which liquid is controlled (as by regulation of the pressure on the system) so as to maintain the temperature of the reacted vapor mixture within the desired limits. The temperature of the reaction vapor mixture is then reduced in the cooler 15 to a point, for example, just above the dew-point of said mixture with respect to the phthalic anhydride (about 122° to 130° C.)

The precooled gaseous reaction mixture passes from the cooler 15 through pipe 16 into the mixing chamber 17 where it is mixed and diluted with about 4 to 5 volumes of air at ordinary atmospheric or room temperature drawn into the mixing chamber by the suction on the system created by fan 26, and by the injector action of the reacted vapor mixture entering the chamber 17 through pipe 16.

In order to control the ratio of diluting gas to gaseous reaction mixture in the mixing chamber 17, as shown in Fig. 1 of the drawing, the pipe 16 leading from the cooler 15 has a fixed cross-sectional area and the inlet 18 for the diluting gas is provided with an orifice plate 19 for controlling the amount of diluting gas entering the mixing chamber. For operation under relatively fixed conditions, a fixed orifice-plate having an opening of the desired size may be employed; for operation under differing fixed conditions, removable interchangeable orifice plates may be employed; and for operation under varying conditions, suitable valve control mechanism and associated gas flow-meters may be employed. A modified form of air supply for the mixing chamber 17 is shown in Fig. 2 of the drawing, in which the mixing chamber 17' comprises a cylindrical shell 28 connected at one end with the dust separator 20 and open to the atmosphere at the other end. The vapor pipe 16' projects into the mixing chamber 17' leaving a passage 29 between the inner wall of the shell 28 and the vapor pipe 16' for the entry of air. The amount of air introduced into the mixing chamber may be controlled by controlling the suction effect on the system of the fan 26 or by providing a suitable damper for the passage 29. The suction effect of the pump 26 on the mixing vessel 17 or 17' may also be controlled by providing a valve 27 in the outlet pipe 25. Furthermore, the amount of diluting gas drawn into the mixing vessel 17 or 17' may be varied by changing the size, capacity, or operative speed of the pump 26.

The rapid cooling of the gaseous reaction mixture by admixing it with the relatively cooler air reduces the temperature of the gas mixture to within the range of about 30° to about 60° C. and causes rapid precipitation of the phthalic anhydride in the form of a very fine powder or dust. With efficient operation, the temperature of the gas mixture may be reduced to the preferred temperature of approximately 40° C. The diluted mixture containing the precipitated phthalic anhydride is then passed through the dust separator 20 where the phthalic anhydride is separated from the remaining gases by the bags 21 and dropped into the hopper 22 by suitable shaking mechanism (not shown). Uncondensed vapors and gases are exhausted from the dust separator 20 through the outlet 25 by the suction fan 26.

The phthalic anhydride obtained in this manner is in the form of very small, almost microscopic, needle-like crystals which are white to greenish-gray to yellowish-gray in color, substantially uniform in size, and of greater purity than the composite phthalic anhydride product ordinarily obtained by slowly cooling the gaseous reaction mixture issuing from the converter in large, externally cooled chambers.

Without limiting the invention to any theoretical explanation of the phenomena involved, the purification appears to be due, at least in part, to the dilution of the gas mixture to such an extent that, although the temperature of the diluted mixture is at a value corresponding with the dew-point of a gas mixture having a very low concentration of phthalic anhydride, it is sufficiently high to retain in the vapor form most of the impurities present in the original mixture. Furthermore, because of the finely divided form in which the product separates, it exposes a large surface to the gas stream; so that during the filtration step the gas stream may exert a washing action on the phthalic anhydride crystals and revaporize impurities which may have been carried down by the phthalic anhydride.

Substantially all of the phthalic anhydride produced is recovered, with the exception of that passing out of the dust separator in the gas stream. The gas stream leaving the absorber and containing uncondensed phthalic anhydride, maleic anhydride, and other products of combustion may be discharged into the atmosphere or it may be passed through an absorber or absorbers containing water, alkaline solutions, etc., to recover said products, if desired.

It will be realized by those skilled in the art that the invention is not limited to the details of the foregoing specific description but that various changes may be made, both in the process and in the apparatus. Instead of diluting the gaseous reacted mixture and simultaneously cooling it below the dew-point by the action of a cooler diluting gas, the mixture may be diluted with a diluting gas and simultaneously cooled below the dew-point by indirect cooling. It may even be first diluted and then cooled by indirect cooling, although the results are not as satisfactory as when the other procedures are followed. The simultaneous cooling and dilution of the gaseous reacted mixture by cooler gas is preferred, inasmuch as it leads to a more efficient process and a purer product.

The extent to which the dilution is carried and the temperatures of the gaseous reacted mixture and diluting gas may be varied, depending upon the desired yield and purity of product. In recovering phthalic anhydride from a gaseous mixture which is initially at a high temperature, it is not essential to precool the mixture to a point close to the dew-point of the desired product before diluting it with the cooler gas, but precooling is preferred as it makes for greater simplicity and economy of operation, requires less air, and produces greater uniformity in results and larger yields.

It is furthermore not essential to carry out the cooling by dilution with the diluting gas as a single stage process, in the manner above described; on the contrary the invention includes reduction of the temperature of the gaseous mixture in a plurality of stages, with separate collection of precipitated phthalic anhydride at each stage, so that products of various degreees of purity may be obtained, if desired. For example, the gaseous reeaction mixture above described, with or without precooling may be cooled to a temperature of, say 80° C., by the addition of a suitable quantity of air at atmospheric temperature; the resulting precipitated phthalic anhydride may be separated from the remaining gaseous mixtures; the remaining gaseous mixture may be further cooled to a temperature of, say 60° C., by dilution with a suitable quantity of additional air at atmospheric temperature; the phthalic anhydride precipitated at this stage may then be separated from the residual gaseous mixture; the residual gaseous mixture may be further cooled to the desired minimum temperature by further dilution with air; and the resulting precipitated phthalic anhydride may also be recovered from the remaining gases. Obviously the precipitation of the phthalic anhydride by direct cooling with a diluting gas may be carried out in any number of stages desired and at any suitable intermediate temperatures between the dew-point of the original mixture and the minimum temperature to be employed.

While the invention has been specifically described with particular reference to the recovery of phthalic anhydride from gaseous mixtures resulting from the catalytic air-oxidation of naphthalene vapor, the invention is not limited thereto but may be employed for the recovery of phthalic anhydride from other vapor or gaseous mixtures, or for the production of phthalic anhydride in finely divided form, as well as for the purification of phthalic anhydride. Thus, the invention may be employed to produce finely divided crystalline phthalic anhydride from phthalic anhydride which does not require purification; for example, by vaporizing (distilling or subliming) the phthalic anhydride and subjecting the vapors to dilution and cooling in accordance with the process of the invention. Or the invention may be employed in conjunction with other purification processes. Thus, phthalic anhydride resulting from a distillation or sublimation process of purification, in which phthalic anhydride is removed by vaporization from less volatile impurities, may be further purified and simultaneously recovered in the highly advantageous, finely powdered form of the present invention by subjecting the phthalic anhydride vapor or vapor mixture, resulting from the distillation or sublimation, to the dilution and cooling process of the present invention.

I claim:

1. The method of obtaining phthalic anhydride in the solid form which comprises providing phthalic anhydride in the vapor form, cooling the phthalic anhydride vapor, and diluting it with an inert gas, whereby phthalic anhydride is precipitated in the form of finely divided solid particles.

2. The method of obtaining phthalic anhydride in the solid form which comprises providing phthalic anhydride in the vapor form at a temperature above the melting point of phthalic anhydride, cooling the phthalic anhydride vapor to a temperature below the melting point of phthalic anhydride, and simultaneously diluting it with an inert gas, whereby the phthalic anhydride is precipitated in the form of finely divided solid particles.

3. The method of obtaining phthalic anhydride in the solid form which comprises providing phthalic anhydride in the vapor form at a temperature above the melting point of phthalic anhydride, diluting the phthalic anhydride vapor with a cooler inert gas, whereby phthalic anhydride is precipitated in the form of finely divided solid particles, and separating said solid particles from the resulting gaseous mixture.

4. The method of obtaining phthalic anhydride in the solid form which comprises providing phthalic anhydride in the vapor form at a temperature above the melting point of phthalic anhydride, diluting the phthalic anhydride with an inert gas which is at a temperature below the melting point of phthalic anhydride, whereby phthalic anhydride is precipitated in the form of finely divided solid particles, and separating said solid particles from the resulting gaseous mixture.

5. In the recovery of phthalic anhydride from a hot gaseous reaction mixture resulting from the catalytic oxidation of an organic compound in the vapor phase, the improvement which comprises diluting the gaseous reaction mixture with an inert gas while cooling it to a temperature below the melting point of phthalic anhydride and not above the dew-point of the resulting diluted mixture with respect to phthalic anhydride, whereby phthalic anhydride is precipitated in the form of finely divided solid particles.

6. The method of obtaining phthalic anhydride in the solid form which comprises providing phthalic anhydride in the vapor form at a temperature above the melting point of phthalic anhydride, mixing the phthalic anhydride vapor with cooler air, the amount and temperature of the air being such that the temperature of the resulting mixture is not above its dew-point with respect to the phthalic anhydride contained in it and below the melting point of phthalic anhydride, whereby phthalic anhydride is precipitated in the form of finely divided solid particles, and separating said solid particles from the remaining gaseous mixture.

7. In the recovery of phthalic anhydride from a hot gaseous reaction mixture resulting from the catalytic oxidation of an organic compound in the vapor phase, the improvement which comprises mixing the gaseous reaction mixture with cooler air, the amount and temperature of the air being such that the resulting mixture is at a temperature below its dew-point with respect to the phthalic anhydride contained in it and below the melting point of phthalic anhydride, whereby phthalic anhydride is precipitated in the form of finely divided solid particles, and separating said phthalic anhydride particles from the remaining gaseous mixture.

8. In the recovery of phthalic anhydride from a hot gaseous reaction mixture resulting from the catalytic oxidation of naphthalene in the vapor phase, the improvement which comprises cooling the hot gaseous reaction mixture to a temperature a little above its dew-point with respect to the phthalic anhydride contained in said reaction mixture, mixing the cooled gaseous reaction mixture with air, the amount and temperature of the air being such that the resulting mixture is at a temperature below its dew-point with respect to the phthalic anhydride contained in it and below the melting point of phthalic anhydride, whereby phthalic anhydride is precipitated in the form of finely divided solid particles, and separating said phthalic anhydride particles from the remaining gaseous mixture.

9. In the recovery of phthalic anhydride from a hot gaseous reaction mixture resulting from the catalytic oxidation of an organic compound in the vapor phase, the improvement which comprises admixing the gaseous reaction mixture with a cooler inert gas, the amount and temperature of the inert gas being such that the gaseous reaction mixture is cooled to a temperature below the melting point of phthalic anhydride and below the dew-point of the resulting gaseous admixture with respect to phthalic anhydride but above its dew-point with respect to the accompanying impurities contained in the gaseous reaction mixture, whereby phthalic anhydride is precipitated in the form of finely divided solid particles while impurities remain in the vapor form, and separating said solid particles of phthalic anhydride from the remaining gaseous mixture containing said impurities.

10. In the recovery of phthalic anhydride from a hot gaseous reaction mixture resulting from the catalytic oxidation of naphthalene in the vapor phase, the improvement which comprises cooling the hot gaseous reaction mixture to a temperature only a little above its dew-point with respect to the phthalic anhydride contained in it, admixing the cooled gaseous reaction mixture with cooler air, the amount and temperature of the air being such that the gaseous reaction mixture is cooled to a temperature below the melting point of phthalic anhydride and below the dew-point of the resulting gaseous admixture with respect to phthalic anhydride but above its dew-point with respect to accompanying impurities contained in the gaseous reaction mixture, whereby phthalic anhydride is precipitated in the form of a dust while impurities remain in the vapor form, and removing said phthalic anhydride dust from the resulting admixture.

11. In the recovery of phthalic anhydride from a hot gaseous reaction mixture resulting from passing a mixture containing 1 part by weight of naphthalene vapor and about 25 to about 35 parts by weight of air in contact with an oxidation catalyst at a temperature within the range of 450°–600° C., the improvement which comprises cooling the said gaseous reaction mixture to a temperature of about 122° to about 130° C., then mixing air with said mixture, the amount and temperature of the air being such that the gaseous reaction mixture is further cooled to a temperature of about 30° to about 60° C., whereby phthalic anhydride is precipitated in the form of a dust while accompanying impurities remain in the vapor form, and passing the resulting mixture through a dust filter, whereby the phthalic anhydride is recovered in a purified, finely divided solid form from the remaining gaseous mixture containing said impurities.

HAROLD B. FOSTER.